United States Patent
Lutz et al.

(10) Patent No.: US 6,201,055 B1
(45) Date of Patent: Mar. 13, 2001

(54) SILICONE COMPOSITION AND SILICONE PRESSURE SENSITIVE ADHESIVE

(75) Inventors: Michael Andrew Lutz, Hope; Andrew Anthony Mojica, Freeland; Michael John Watson, Midland, all of MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/266,307

(22) Filed: Mar. 11, 1999

(51) Int. Cl.$^7$ ........................................................ C08K 3/36
(52) U.S. Cl. ............................ 524/493; 524/588; 525/478
(58) Field of Search ........................... 525/478; 524/493, 524/588

(56) References Cited

U.S. PATENT DOCUMENTS

| | | | |
|---|---|---|---|
| 2,676,182 | 4/1954 | Daudt et al. ...................... | 260/448.2 |
| 3,122,516 | 2/1964 | Polmanteer ........................ | 260/37 |
| 3,334,062 | 8/1967 | Brown et al. ...................... | 260/37 |
| 3,419,593 | 12/1968 | Willing ............................... | 260/448.2 |
| 3,624,023 | 11/1971 | Hartlage ............................. | 260/37 |
| 3,635,743 | 1/1972 | Smith .................................. | 106/288 |
| 3,983,298 | * 9/1976 | Hahn et al. ........................ | 428/355 |
| 4,584,355 | 4/1986 | Blizzard et al. .................... | 525/477 |
| 4,585,836 | 4/1986 | Homan et al. ..................... | 525/477 |
| 4,591,622 | 5/1986 | Blizzard et al. .................... | 525/477 |
| 4,766,176 | 8/1988 | Lee et al. ........................... | 525/100 |
| 4,774,297 | 9/1988 | Murakami et al. ................. | 525/478 |
| 4,988,779 | 1/1991 | Medford et al. ................... | 525/478 |
| 5,017,654 | 5/1991 | Togashi et al. .................... | 525/100 |
| 5,100,976 | 3/1992 | Hamada et al. .................... | 525/477 |
| 5,232,702 | * 8/1993 | Pfister et al. ....................... | 424/448 |
| 5,290,885 | 3/1994 | Vincent et al. ..................... | 525/478 |
| 5,292,586 | 3/1994 | Lin et al. ............................ | 428/355 |
| 5,366,809 | 11/1994 | Schmidt et al. .................... | 428/447 |
| 5,399,614 | 3/1995 | Lin et al. ............................ | 524/588 |
| 5,446,532 | 8/1995 | Yamazaki ........................... | 356/73 |

* cited by examiner

Primary Examiner—Margaret G. Moore
(74) Attorney, Agent, or Firm—Larry A. Milco

(57) ABSTRACT

A silicone composition for preparing a silicone pressure sensitive adhesive, the composition comprising (A) 20 to 55 parts by weight of a polydiorganosiloxane containing an average of at least two silicon-bonded alkenyl groups per molecule; (B) 45 to 80 parts by weight of an organopolysiloxane resin consisting essentially of $R^3_3SiO_{1/2}$ units and $SiO_{4/2}$ units, wherein the total amount of components (A) and (B) is 100 parts by weight; (C) an organohydrogenpolysiloxane having an average of at least two silicon-bonded hydrogen atoms per molecule in an amount sufficient to cure the composition; (D) 25 to 200 parts by weight of a silica filler having an average surface area less than 25 m$^2$/g; and (E) a catalytic amount of a hydrosilylation catalyst. Each $R^3$ is independently selected from the group consisting of monovalent hydrocarbon and monovalent halogenated hydrocarbon groups. The mole ratio of $R^3_3SiO_{1/2}$ units to $SiO_{4/2}$ units in the organopolysiloxane resin is from 0.6:1 to 1.5:1 and the resin contains less than about 2 mole percent of alkenyl groups. The sun of the average number of silicon-bonded alkenyl groups per molecule in component (A) and the average number of silicon-bonded hydrogen atoms per molecule in component (C) is greater than 4. A silicone pressure sensitive adhesive comprising a reaction product of the above-described composition. A multi-part silicone composition comprising components (A) through (E) in two or more parts, provided neither component (A) nor component (B), when component (B) contains alkenyl groups, are present with components (C) and (E) in the same part.

24 Claims, No Drawings

SILICONE COMPOSITION AND SILICONE PRESSURE SENSITIVE ADHESIVE

FIELD OF THE INVENTION

The present invention relates to a silicone composition for preparing a silicone pressure sensitive adhesive and more particularly to an addition-curable silicone composition containing a certain concentration of a silica filler having a low surface area. The present invention also relates to a silicone pressure sensitive adhesive produced from such composition.

BACKGROUND OF THE INVENTION

Silicone pressure sensitive adhesives, hereinafter also referred to as silicone PSAs, are useful in a variety of applications by virtue of their unique properties, including excellent adhesive and cohesive strength, high tack, very low alpha particle emissions, good moisture resistance, good electrical properties, high ionic purity, and good adhesion to low energy substrates. For example, silicone PSAs are widely used in adhesive tapes, bandages, low-temperature backings, transfer films, and labels. Moreover, silicone PSAs are used in the assembly of automotive parts, toys, electronic circuits, and keyboards.

Addition-curable silicone compositions useful for preparing silicone pressure sensitive adhesives are known in the art. For example, silicone compositions containing an alkenyl-containing polydiorganosiloxane, an organopolysiloxane resin, an organohydrogenpolysiloxane, and a hydrosilylation catalyst are disclosed in U.S. Pat. No. 5,290,885 to Vincent et al.; U.S. Pat. No. 5,366,809 to Schmidt et al.; U.S. Pat. No. 3,983,298 to Hahn et al.; U.S. Pat. No. 5,399,614 to Lin et al.; U.S. Pat. No. 5,100,976 to Hamada et al.; U.S. Pat. No. 5,446,532 to Wengrovius et al.; U.S. Pat. No. 4,774,297 to Murakami et al.; U.S. Pat. No. 4,988,779 to Medford et al.; and U.S. Pat. No. 5,292,586 to Lin et al. The above-cited references disclose adding only small amounts of additional ingredients, including fillers, to the addition-curable silicone compositions. However, these references do not teach the silica filler of the present invention or the concentration of such filler.

However, conventional addition-curable silicone compositions, including the aforementioned, cure to form silicone pressure sensitive adhesives having relatively high coefficients of thermal expansion, rendering them unsatisfactory for certain applications, such as attachment of heat sinks to semiconductor chips and semiconductor chips to substrates. During thermal cycling, stresses develop in the silicone pressure sensitive adhesive due to differences in the coefficients of thermal expansion between the substrate materials and the adhesive. Thermally-induced stresses can weaken or fracture the pressure sensitive bond, limiting the useful service life of a device.

While inorganic fillers such as silica and alumina are typically added to silicone rubber compositions to reduce the coefficient of thermal expansion of cured products, silicone compositions for preparing silicone pressure sensitive adhesives are usually unfilled or contain only low concentrations, for example, less than about 5 percent by weight, of filler. Fillers are generally considered undesirable in the later silicone compositions because moderate to high amounts of filler can cause and increase in viscosity of a given composition and also significantly reduce the tack of the silicone PSA produced therefrom.

Therefore, there is a need for an addition-curable silicone composition that cures to form a silicone pressure sensitive adhesive having a low coefficient of thermal expansion and high tack.

SUMMARY OF THE INVENTION

The present inventors have discovered that a silicone composition containing a certain concentration of a silica filler having a low surface area cures to form a silicone pressure sensitive adhesive having a low coefficient of thermal expansion and unexpectedly high tack.

Specifically, the present invention is directed to a silicone composition for preparing a silicone pressure sensitive adhesive, the composition comprising (A) 20 to 55 parts by weight of a polydiorganosiloxane containing an average of at least two silicon-bonded alkenyl groups per molecule; (B) 45 to 80 parts by weight of an organopolysiloxane resin consisting essentially of $R^3_3SiO_{1/2}$ units and $SiO_{4/2}$ units, wherein the total amount of components (A) and (B) is 100 parts by weight; (C) an organohydrogenpolysiloxane having an average of at least two silicon-bonded hydrogen atoms per molecule in an amount sufficient to cure the composition; (D) 25 to 200 parts by weight of a silica filler having an average surface area less than 25 $m^2/g$; and (E) a catalytic amount of a hydrosilylation catalyst. In the above formula for the organopolysiloxane resin, each $R^3$ is independently selected from the group consisting of monovalent hydrocarbon and monovalent halogenated hydrocarbon groups. The mole ratio of $R^3_3SiO_{,1/2}$ units to $SiO_{4/2}$ units in the organopolysiloxane resin is from 0.6:1 to 1.5:1 and the resin contains less than about 2 mole percent of alkenyl groups. The sum of the average number of silicon-bonded alkenyl groups per molecule in component (A) and the average number of silicon-bonded hydrogen atoms per molecule in component (C) is greater than 4.

The present invention is also directed to a silicone pressure sensitive adhesive comprising a reaction product of the above-described composition.

The present invention is further directed to a multi-part silicone composition for preparing a silicone pressure sensitive adhesive, the composition comprising components (A) through (E) in two or more parts, provided neither component (A) nor component (B), when component (B) contains alkenyl groups, are present with components (C) and (E) in the same part.

The silicone composition of the present invention has numerous advantages, including good flow, low VOC (volatile organic compound) content, and rapid low. Moreover, the present silicone composition cures to form a silicone pressure sensitive adhesive having good adhesion, a low coefficient of thermal expansion, and unexpectedly high tack.

The silicone composition of the present invention is useful for preparing a silicone pressure sensitive adhesive. The silicone PSA of the present invention has numerous uses, including adhesive tapes, bandages, and labels. The present silicone PSA composition is also useful for bonding a variety of materials, particularly electronic components to flexible or rigid substrates.

These and other features, aspects, and advantages of the present invention will become better understood with reference to the following description and appended claims.

DETAILED DESCRIPTION OF THE INVENTION

According to the present invention, a silicone composition for preparing a silicone pressure sensitive adhesive, comprises:

(A) 20 to 55 parts by weight of a polydiorganosiloxane containing an average of at least two silicon-bonded alkenyl groups per molecule;

(B) 45 to 80 parts by weight of an organopolysiloxane resin consisting essentially of $R^3{}_3SiO_{1/2}$ units and $SiO_{4/2}$ units wherein each $R^3$ is independently selected from the group consisting of monovalent hydrocarbon and monovalent halogenated hydrocarbon groups, the mole ratio of $R^3{}_3SiO_{1/2}$ units to $SiO_{4/2}$ units is from 0.6:1 to 1.5:1, the resin contains less than about 2 mole percent of alkenyl groups, and the total amount of components (A) and (B) is 100 parts by weight;

(C) an organohydrogenpolysiloxane having an average of at least two silicon-bonded hydrogen atoms per molecule in an amount sufficient to cure the composition;

(D) 25 to 200 parts by weight of a silica filler having an average surface area less than 25 $m^2/g$; and (E) a catalytic amount of a hydrosilylation catalyst; wherein the sum of the average number of silicon-bonded alkenyl groups per molecule in component (A) and the average number of silicon-bonded hydrogen atoms per molecule in component (C) is greater than 4.

Component (A) of the present invention is a polydiorganosiloxane containing an average of at least two silicon-bonded alkenyl groups per molecule. The structure of component (A) is typically linear, however it may contain some branching due to the presence of trifunctional siloxane units. Suitable alkenyl groups typically contain from 2 to about 10 carbon atoms and are exemplified by, but not limited to, vinyl, allyl, butenyl, and hexenyl. The alkenyl groups in component (A) may be located at terminal, pendant, or both terminal and pendant positions. The remaining silicon-bonded organic groups in component (A) are independently selected from the group consisting of monovalent hydrocarbon and monovalent halogenated hydrocarbon groups free of aliphatic unsaturation. These monovalent groups typically contain from 1 to about 20 carbon atoms, preferably from 1 to 10 carbon atoms, and are exemplified by, but not limited to alkyl such as methyl, ethyl, propyl, pentyl, octyl, undecyl, and octadecyl; cycloalkyl such as cylcohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least 50 percent, and more preferably at least 80%, of the organic groups free of aliphatic unsaturation in component (A) are methyl.

The viscosity of component (A) at 25° C., which varies with molecular weight and structure, is typically from 0.05 to about 10,000 Pa·s, preferably from 0.05 to 100 Pa·s, and more preferably from 0.6 to 50 Pa·s. Typically, a solventless silicone composition can be prepared when component (A) has a viscosity of from 0.05 to 100 Pa·s at 25° C. When the viscosity of the polydiorganosiloxane is greater than 100 Pa·s, a suitable quantity of an organic solvent may be added to facilitate processing and/or application. Component (A) can comprise a single polydiorganosiloxane or a mixture of two or more polydiorganosiloxanes having different structures and/or viscosities.

Preferably, component (A) is a polydiorganosiloxane having the general formula $R^2R^1{}_2SiO(R^1{}_2SiO)_nSiR^1{}_2R^2$ wherein each $R^1$ is independently selected from the group consisting of monovalent hydrocarbon and monovalent halogenated hydrocarbon groups free of aliphatic unsaturation, as defined above; $R^2$ is alkenyl, as defined above; and n has a value such that the viscosity of component (A) at 25° C. is in one of the ranges cited above. Preferably, $R^1$ is methyl and $R^2$ is vinyl.

Specific examples of polydiorganosiloxanes useful in the present invention include, but are not limited to, the following: $ViMe_2SiO(Me_2SiO)_nSiMe_2Vi$, $ViMe_2SiO(Me_2SiO)_{0.95n}(MePhSiO)_{0.05n}SiMe_2Vi$, $ViMe_2SiO(Me_2SiO)_{0.95n}(Ph_2SiO)_{0.05n}SiMe_2Vi$, $ViMe_2SiO(Me_2SiO)_{0.98n}(MeViSiO)_{0.02n}SiMe_2Vi$, $Me_3SiO(Me_2SiO)_{0.95n}(MeViSiO)_{0.05n}SiMe_3$, $PhMeViSiO(Me_2SiO)_nSiPhMeVi$, where Me, Vi, and Ph denote methyl, vinyl, and phenyl respectively and n is as defined above. Preferred polydiorganosiloxanes are dimethylvinylsiloxy-terminated polydimethylsiloxanes.

The concentration of component (A) in the silicone composition of the present invention is typically from 20 to 55 parts by weight and preferably from 30 to 45 parts by weight, per 100 parts by weight of components (A) and (B) combined.

Methods for preparing component (A) of the present composition, such as condensation of the corresponding halosilanes or equilibration of cyclic polydiorganosiloxanes, are well known in the art.

Component (B) of the present invention is an organopolysiloxane resin consisting essentially of $R^3{}_3SiO_{1/2}$ siloxane units and $SiO_{4/2}$ siloxane units wherein each $R^3$ is independently selected from the group consisting of monovalent hydrocarbon and monovalent halogenated hydrocarbon groups. The monovalent groups represented by $R^3$ typically contain from 1 to about 20 carbon atoms, preferably from 1 to about 10 carbon atoms, and are exemplified by, but not limited to, alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least one-third, and more preferably substantially all $R^3$ groups in component (B) are methyl.

The mole ratio of $R^3{}_3SiO_{1/2}$ units (M units) to $SiO_{4/2}$ units (Q units) in component (B) is typically from 0.6:1 to 1.5:1, and preferably from 0.65:1 to 0.95:1, as determined by $^{29}Si$ nuclear magnetic resonance ($^{29}Si$ NMR) spectrometry. The M/Q ratio represents the total number of M units to the total number of Q units in component (B) and includes contributions from any neopentamer present, described below.

When the organopolysiloxane resin of the present invention is prepared by well known methods, such as the method of Daudt et al., described below, the resin generally contains silicon-bonded hydroxyl groups. Component (B) typically contains less than 3 percent by weight and preferably contains less than 1 percent by weight of silicon-bonded hydroxyl groups, based on the total weight of the resin.

Component (B) contains less than about 2 mole percent of alkenyl groups and preferably component (B) is free of alkenyl groups. The mole percent of alkenyl groups in the organopolysiloxane resin is defined here as the ratio of the number of moles of alkenyl-containing siloxane units in the resin to the total number of moles of siloxane units in the resin, multiplied by 100. When the alkenyl content of the resin exceeds about 2 mole percent, the adhesive properties, tack and peel, of the silicone PSA tend to deteriorate.

Component (B) can comprise a single organopolysiloxane resin or a mixture of two or more organopolysiloxane resins. Component (B) can also contain a small amount of a low molecular weight material comprised substantially of a neopentamer organopolysiloxane having the formula $(R_3SiO)_4Si$, the latter material being a byproduct in the preparation of the resin according to the method of Daudt et al., described infra. Additionally, component (B) may contain minor amounts of diorganosiloxane and triorganosiloxane units.

A preferred organopolysiloxane resin consists essentially of $(CH_3)_3SiO_{1/2}$ siloxane units and $SiO_{4/2}$ siloxane units, wherein the mole ratio of $(CH_3)_3SiO_{1/2}$ units to $SiO_{4/2}$ units is about 0.9:1, and the resin contains less than 1 percent by weight of hydroxyl groups.

The concentration of component (B) in the composition of the present invention is typically from 45 to 80 parts by weight and preferably from 55 to 70 parts by weight, per 100 parts by weight of components (A) and (B) combined. When the concentration of component (B) is less than about 45 parts by weight, the tack of the silicone PSA tends to deteriorate. At concentrations greater than about 80 parts by weight, the viscosity of the silicone composition increases and the silicone PSA tends to be hard and brittle.

Component (B) of the present invention can be prepared by methods well-known in the art. Preferably, component (B) is prepared by the silica hydrosol capping process of Daudt et al. disclosed in U.S. Pat. No. 2,676,182, which is hereby incorporated by reference to teach how to prepare organopolysiloxane resins which are useful in the present invention. This method involves reacting a silica hydrosol under acidic conditions with a hydrolyzable triorganosilane such as trimethylchlorosilane, a siloxane such as hexamethyldisiloxane, or mixtures thereof, and recovering a copolymer having M and Q units. The resulting copolymers generally contain from about 2 to about 3 percent by weight of hydroxyl groups.

The content of silicon-bonded hydroxyl groups in the organopolysiloxane resin can be reduced, preferably to less than 1 percent by weight, by reacting the resin with a suitable endblocking agent. A wide variety of endblocking agents, such as organosiloxanes, organochlorosilanes, and organodisilazanes, are known in the art. Such agents are exemplified in U.S. Pat. No. 4,584,355 to Blizzard et al.; U.S. Pat No. 4,591,622 to Blizzard et al.; and U.S. Pat. No. 4,585,836 to Homan et al.; which are hereby incorporated by reference. A single endblocking agent or a mixture of such agents can be used to prepare the organopolysiloxane resin of the present invention.

Component (C) of the present invention is an organohydrogenpolysiloxane typically having an average of at least two silicon-bonded hydrogen atoms per molecule and an average of no more than one silicon-bonded hydrogen atom per silicon atom. The silicon-bonded hydrogen atoms can be located at terminal, pendant, or at both terminal and pendant positions in the organohydrogenpolysiloxane. Component (C) can be a homopolymer or a copolymer. The structure of the organohydrogenpolysiloxane can be linear, branched, or cyclic. Examples of siloxane units that may be present in component (C) include $HR^4_2SiO_{1/2}$, $R^4_3SiO_{1/2}$ $HR^4SiO_{2/2}$, $R^4_2SiO_{2/2}$, $R^4SiO_{3/2,}$ and $SiO_{4/2}$ units. In the preceding formulae each $R^4$ is independently selected from the group consisting of monovalent hydrocarbon and monovalent halogenated hydrocarbon groups free of aliphatic unsaturation. These monovalent groups typically contain from 1 to about 20 carbon atoms and are exemplified by, but not limited to alkyl such as methyl, ethyl, propyl, pentyl, octyl, undecyl, and octadecyl; cycloalkyl such as cylcohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least 50 percent of the organic groups in component (C) are methyl. Component (C) can be a single organohydrogenpolysiloxane or a mixture of two or more different organohydrogenpolysiloxanes. A preferred organohydrogenpolysiloxane is 1-octadecyl-1,3,5,7,9-pentamethylcyclopentasiloxane.

The concentration of component (C) in the silicone composition of the present invention is sufficient to cure the composition. The extent of cure depends on the mole ratio of silicon-bonded hydrogen atoms in component (C) to the alkenyl groups present in components (A) and (B) combined. Typically, component (C) is present in an amount sufficient to provide from 1 to 3 silicon-bonded hydrogen atoms per alkenyl group in components (A) and (B) combined. Preferably, component (C) is present in an amount sufficient to provide from 1.5 to 2 silicon-bonded hydrogen atoms per alkenyl group in components (A) and (B) combined Organohydrogenpolysiloxanes which are suitable for use in the silicone composition of the present invention and methods for their preparation are well known in the art.

To ensure compatibility of components (A), (B), and (C), described supra, the predominant organic group in each component is preferably the same. Preferably this group is methyl.

Component (D) of the present invention is a silica filler comprising silica having an average surface area (BET method) of less than 25 $m^2/g$, preferably from 0.25 to 10 $m^2/g$, and more preferably from 0.25 to 5 $m^2/g$. Examples of silica fillers suitable for use in the composition of the present invention include, but are not limited to, natural silicas such as crystalline quartz, ground quartz, and diatomaceous silica; synthetic silicas such as fused silica (fused quartz), silica gel, and precipitated silica; and fillers prepared by treating the surfaces of the aforementioned silicas with organosilicon compounds such as organochlorosilanes, organosiloxanes, organodisilazanes, and organoalkoxysilanes. Fused Silica and ground quartz are preferred fillers in the silicone composition of the present invention. Fused silica is a particularly preferred filler for silicone compositions used in the fabrication of electronic devices, particularly random access memory (RAM) devices, due to its exceedingly low coefficient of thermal expansion and very low alpha particle emissions. Component (D) can comprise a single type of silica filler or a mixture of two or more types of silica fillers, each having a surface area less than 25 $m^2/g$.

Although, the shape of the silica filler particles is not critical, particles having a spherical shape are preferred because they generally impart a smaller increase in viscosity to the silicone composition than particles having other shapes. A particularly preferred silica filler is an electronic DRAM grade spherical fused silica having an average particle size of 13 micron and an average surface area of about 0.46 $m^2/g$.

The concentration of component (D) in the silicone composition of the present invention is important with respect to the pre-cure viscosity and the properties achieved following curing, particularly thermal expansion and tack. The concentration of component (D) is from 25 to 200 parts by weight, preferably from 25 to 150 parts by weight, and more preferably from 25 to 100 parts by weight, per 100 parts by weight of components (A) and (B) combined. When the concentration of component (D) is less than 25 parts by weight, the coefficient of thermal expansion of the silicone PSA in the range from 25 to 150° C. is not markedly improved relative to the CTE of the adhesive obtained from the same composition absent component (D). At concentrations greater than 200 parts by weight, the tack of the silicone PSA is less than the tack of the adhesive obtained from the same composition absent component (D).

Silica fillers which are suitable for use in the silicone composition of the present invention and methods for their preparation are well known in the art; many of these silica fillers are commercially available. As indicated above, the silica filler of the present invention can be an untreated silica or a filler prepared by treating a silica with an organosilicon compound. In the latter case, the silica can be treated prior to admixture with the other ingredients of the silicone composition or the silica can be treated in situ during the preparation of the silicone composition. Methods for treating silicas with organosilanes, organodisilazanes, and organosiloxanes are well known in the art and exemplified in U.S. Pat. No. 3,122,516 to Polmanteer; U.S. Pat. No 3,334,062 to Brown and Hyde; U.S. Pat. No. 3,635,743 to Smith; and U.S. Pat. No. 3,624,023 to Hartage. These patents are hereby incorporated by reference to teach treating agents and methods useful for preparing the silica filler of the present invention.

Component (E) of the present invention is a hydrosilylation catalyst that promotes the addition reaction of components (A) and (B), when component (B) contains alkenyl groups, with component (C). The hydrosilylation catalyst can be any of the well known hydrosilylation catalysts comprising a platinum group metal, a compound containing a platinum group metal, or a microencapsulated platinum group metal or compound containing same. These metals include platinum, rhodium, ruthenium, palladium, osmium and iridium. Platinum and platinum compounds are preferred catalysts based on their high activity in hydrosilylation reactions.

Examples of the resins employed in microencapsulated catalysts include, but are not limited to organosilicon resins and organic resins derived from ethylenically unsaturated hydrocarbons and/or esters of ethylenically unsaturated carboxylic acids, such as acrylic and methacrylic acids. Microencapsulated hydrosilylation catalysts are described in U.S. Pat. Nos. 4,766,176 and 5,017,654, which are hereby incorporated by reference.

A preferred class of platinum catalysts are the complexes of chloroplatinic acid with certain vinyl-containing organosiloxane compounds disclosed by Willing in U.S. Pat. No. 3,419,593, which is hereby incorporated by reference. A particularly preferred catalyst of this type is the reaction product of chloroplatinic acid and 1,3-diethenyl-1,1,3,3-tetramethyldisiloxane.

The hydrosilylation catalyst is present in an amount sufficient to catalyze the addition reaction of components (A) and (B), when component (B) contains alkenyl groups, with component (C). Typically, the concentration of component (E) is sufficient to provide from 0.1 to 1000, preferably from 1 to 500, and more preferably from 5 to 50 parts per million of a platinum group metal, based on the combined weight of components (A), (B), and (C). The rate of cure is very slow below 0.1 ppm of platinum group metal. The use of more than 1000 ppm of platinum group metal results in no appreciable increase in cure rate, and is therefore uneconomical.

Mixtures of the aforementioned components (A), (B), (C), (D), and (E) may begin to cure at ambient temperature. To obtain a longer working time or "pot life", the activity of the catalyst under ambient conditions can be retarded or suppressed by the addition of a suitable inhibitor to the silicone composition of the present invention. A platinum catalyst inhibitor retards curing of the present silicone composition at ambient temperature, but does not prevent the composition from curing at elevated temperatures. In order to be effective in this invention, the platinum catalyst inhibitor must be soluble in the silicone composition. Suitable platinum catalyst inhibitors include various "ene-yne" systems such as 3-methyl-3-penten-1-yne and 3,5-dimethyl-3-hexen-1-yne; acetylenic alcohols such as 3,5-dimethyl-1-hexyn-3-ol, 1-ethynyl-1-cyclohexanol, and 2-Phenyl-3-butyn-2-ol; maleates and fumarates, such as the well known dialkyl, dialkenyl, and dialkoxyalkyl fumarates and maleates; and cyclovinylsiloxanes.

Acetylenic alcohols constitute a preferred class of inhibitors in the silicone composition of the present invention. 3,5-Dimethyl-1-hexyn-3-ol is a particularly preferred inhibitor in the present invention. Compositions containing these inhibitors generally require heating at 70° C. or above to cure at a practical rate.

The concentration of platinum catalyst inhibitor in the present silicone composition is sufficient to retard curing of the composition at ambient temperature without preventing or excessively prolonging cure at elevated temperatures. This concentration will vary widely depending on the particular inhibitor used, the nature and concentration of the hydrosilylation catalyst, and the nature of the organohydrogenpolysiloxane.

Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. Generally, the inhibitor is present in an amount from 1 to 100 moles per mole of platinum group metal. The optimum concentration for a particular inhibitor in a given silicone composition can be readily determined by routine experimentation.

The silicone composition of the present invention can further comprise an appropriate quantity of a solvent to lower the viscosity of the composition and facilitate the preparation, handling, and application of the composition. Examples of suitable solvents include, but are not limited to, hydrocarbons such as toluene, xylene, heptane, and mineral spirits; halohydrocarbons; alcohols; esters; ketones; silicone fluids such as linear, branched, and cyclic polydimethylsiloxanes; and combinations of such solvents. The optimum concentration of a particular solvent in the present silicone composition can be readily determined by routine experimentation.

In general, the silicone composition of the present invention can further comprise small amounts of additional ingredients such as antioxidants, pigments, stabilizers, and fillers, provided the ingredient does not adversely affect the physical properties of the silicone PSA, particularly the coefficient of thermal expansion and tack.

The silicone composition of the present invention can be a one-part composition comprising components (A) through (E) in a single part or, alternatively, a multi-part composition comprising components (A) through (E) in two or more parts, provided neither component (A) nor component (B), when component (B) contains alkenyl groups, are present with components (C) and (E) in the same part. For example, a multi-part silicone composition for preparing a silicone pressure sensitive adhesive can comprise a first part containing a portion of component (A), a portion of component (B), a portion of (D), and all of component (E) and a second part containing the remaining portions of components (A), (B), and (D) and all of component (C).

The silicone composition of the instant invention is typically prepared by combining components (A) through (E) and any optional ingredients in the stated proportions at ambient temperature with or without the aid of an organic solvent, which is described above. Although the order of addition of the various components is not critical if the silicone composition is to be used immediately, the hydrosilylation catalyst is preferably added last at a temperature below about 30° C. to prevent premature curing of the composition. Also, the multi-part silicone composition of the present invention can be prepared by combining two or more parts, wherein each part is as defined above. Mixing can be accomplished by any of the techniques known in the art such as milling, blending, and stirring, either in a batch or continuous process. The particular device is determined by the viscosity of the components and the viscosity of the final silicone composition.

The silicone composition of the present invention should be stored in a sealed container to prevent exposure to air and moisture. The one part silicone composition of the present invention may be stored at room temperature for several weeks without any change in the properties of the cured silicone PSA product. However, the shelf life of the one part silicone composition of this invention can be extended to several months by storing the mixtures at a temperature below 0° C., preferably from –30 to –20° C. Individual sealed packages of the multi-part silicone composition described above can be stored for over 6 months at ambient conditions without any deterioration in the performance of the composition produced upon their admixture.

The silicone composition of the present invention can be applied to a surface by any suitable means such as roll-coating, knife coating, blade coating, knife-over-roll coating, gravure coating, dipping, brushing, or spraying.

The silicone composition of the present invention can be applied to any known solid material. Suitable substrates include, but are not limited to, metals such as aluminum, silver, copper, and iron, and their alloys; silicon; porous materials such as paper, wood, leather, and fabrics; polyolefins, such as polyethylene and polypropylene; fluorocarbon polymers such as polytetrafluoroethylene and polyvinylfluoride; polystyrene; polyamides such as Nylon; polyimides; polyesters and acrylic polymers; painted surfaces; ceramics; glass; and glass cloth.

A silicone PSA according to the present invention comprises a reaction product of the silicone composition containing components (A) through (E), described above. The silicone composition of this invention can be cured at room temperature or by heating at temperatures up to 200° C., preferably from 70 to 200° C., and more preferably from 125 to 175° C., for a suitable length of time. For example, the present silicone composition cures in less than about one hour at 150° C.

The silicone composition of the present invention has numerous advantages, including good flow, low VOC (volatile organic compound) content, and rapid low temperature cure. Moreover, the present silicone composition cures to form a silicone pressure sensitive adhesive having good adhesion, a low coefficient of thermal expansion, and unexpectedly high tack.

With regard to flow, the present silicone composition possesses the rheological properties required for a number of applications and is easily dispensed and applied to substrates using standard equipment.

Further, the silicone composition of the present invention, which does not require an organic solvent for many applications, has a very low VOC content. Consequently, the present silicone gel composition avoids the health, safety, and environmental hazards associated with solvent-borne silicone compositions. In addition, the solventless composition of the present invention typically undergoes less shrinkage during curing than solvent-borne silicone compositions.

The silicone composition of the present invention cures rapidly at room temperature or moderately elevated temperatures without either an exotherm or the formation of byproducts. In fact, the cure rate of the silicone composition can be conveniently adjusted by controlling the concentration of catalyst and/or optional inhibitor.

Further, the silicone composition of the present invention cures to form a silicone pressure sensitive adhesive having good adhesion to a wide variety of materials, including metals, glass, silicon, silicon dioxide, ceramics, natural rubber, silicone rubber, polyesters, polyolefins, and polyimides.

Importantly, the silicone composition of the present invention cures to form a silicone pressure sensitive adhesive having a low coefficient of thermal expansion and unexpectedly high tack compared to similar silicone compositions excluding the silica filler, component (D). In fact, the tack of the present silicone PSA is typically at least equal to the tack of the same silicone composition absent the silica filler.

The silicone composition of the present invention is useful for preparing a silicone pressure sensitive adhesive. The silicone PSA of the present invention has numerous uses, including adhesive tapes, bandages, and labels. The present silicone PSA composition is also useful for bonding a variety of materials, particularly electronic components to flexible or rigid substrates.

EXAMPLES

The following examples are presented to further illustrate the silicone composition of this invention, but are not to be considered as limiting the invention, which is delineated in the appended claims. All parts and percentages reported in the examples are by weight. The following methods and materials were employed in the Examples:

Viscosity of a silicone composition was determined using a Rheometrics ARES-2KRTN1-FCO-STD Dynamic Viscometer. The instrument was operated in a dynamic shear mode with 2% strain at 23±2° C. Sheer frequency was increased from 0.1 rad/s to 100 rad/s. The reported value for viscosity corresponds to the viscosity of the silicone composition at a sheer frequency of 10 rad/s.

Tack of a silicone PSA was determined using a Series 400 Polyken Probe Tack Tester (Testing Machines, Inc., Amityville, N.Y.) at 23±2° C. The test specimen was prepared by first casting the silicone composition on a fluorosilicone release liner to a thickness of about 0.13 mm. The material was cured at 150° C. in a forced air oven for 1 hour. A sample having a diameter of 25 mm was secured in the test apparatus and the release liner was removed. A stainless steel probe having a diameter of 0.5 cm was brought into contact with the surface of the adhesive at a rate of 0.5 cm/s, contact pressure of 177.5 g-force, and dwell time of 1 second. The probe was then withdrawn at a rate of 0.5 cm/s and the maximum force required to separate the probe from the adhesive was determined. The reported value for tack, expressed in units of gram-force, represents the average of five measurements performed on different regions of the same sample.

Peel adhesion of a silicone PSA was measured using a Keil Tester, which is described in TAPPI, Vol. 43, No. 8, pp. 164A–165A, 1960, at 23±2° C. The test specimen was prepared by first casting the silicone composition on a fluorosilicone release liner to a thickness of about 0.13 mm. The material was cured at 150° C. in a forced air oven for 1 hour. A Mylar film having a thickness of 0.05 mm was applied to the uncoated surface of the cured adhesive and the laminate was rolled once in each lengthwise direction with a 4.5-kg steel roller. A 2.54 cm×12 cm test specimen was cut from the laminate. The release liner was removed from the specimen and the freshly exposed adhesive was applied to a polished 5 cm×15 cm stainless steel plate. The maximum force required to remove the adhesive-coated Mylar from the stainless steel substrate at an angle of 180° and a separation rate of 30 cm/min was determined during each 2.4 cm interval. The reported value for peel, expressed in units of N/m, represents the average of five readings taken during the course of one pull.

Coefficient of linear thermal expansion (CTE) of a silicone PSA was measured using a Dupont Instrument Model 944001.90 v2.3C Thermomechanical Analyzer (TMA). The test specimen was prepared by first curing the silicone composition between release liners in a hot press at 150° C. under 10 tons of pressure for 1 hour to produce a 10.2 cm×10.2 cm×0.16 cm slab. Then a test specimen having a diameter of 6.92 mm was cut from the cured adhesive. A quartz probe having a diameter of 2.78 mm was brought into contact with the surface of the uncoated PSA sample at 25° C. A load of 200 mg was applied to the probe and the temperature of the sample was increased at a rate of 5° C./min to 150° C. The coefficient of linear thermal expansion was calculated by dividing the slope of the secant to the expansion versus temperature cure from 25 to 150° C. by the sample thickness. The reported value for CTE is expressed in units of $\mu m/m°$ C.

Resin/Polymer Blend: a mixture consisting of (i) 70.85 percent by weight of an organopolysiloxane resin consisting of $(CH_3)_3SiO_{1/2}$ siloxane units and $SiO_{4/2}$ siloxane units, wherein the resin has a number-average molecular weight of about 2,600, the mole ratio of $(CH_3)_3SiO_{1/2}$ units to $SiO_{4/2}$ units is about 0.9:1, and the resin contains less than 1 percent by weight of silicon-bonded hydroxyl groups and (ii) 29.15 percent by weight of a dimethylvinylsiloxy-terminated polydimethylsiloxane having a viscosity of about 0.3 to 0.6 Pa·s at 25° C.

Silica A: an electronic DRAM grade spherical fused silica having an average particle size of 15 micron and an average surface area of about 1.3 $m^2/g$.

Silica B: an electronic DRAM grade spherical fused silica having an average particle size of 13 micron and an average surface area of about 0.46 $m^2/g$.

Silica C: an electronic DRAM grade spherical fused silica having an average particle size of 4.4 micron and an average surface area of about 1.3 $m^2/g$.

Inhibitor: 3,5-dimethyl-1-hexyn-3-ol.

Crosslinking Agent: 1-octadecyl-1,3,5,7,9-pentamethylcyclopentasiloxane.

Catalyst: a platinum complex of 1,3-diethenyl-1,1,3,3-tetramethyldisiloxane.

Example 1

A silicone composition according to the present invention was prepared using the following method. First, 100 parts of Resin/Polymer Blend was heated to 130° C. until flowable, approximately thirty minutes. Then, the Resin/Polymer Blend was combined with 27.2 parts of Silica A, 1.0 part of Crosslinking Agent, and 0.1 part of Inhibitor in a 4-ounce polypropylene cup. The composition was initially blended by hand using a spatula and then mixed with an AM-501 Hauschild dental mixer until homogeneous, about ten seconds. After the mixture was allowed to cool to room temperature, 0.01 part of Catalyst was added and the aforementioned mixing procedures were repeated. The sample was de-aired in a vacuum chamber under a pressure of 3733 Pa for 3 min. The viscosity of the composition is 2,212 Pa·s at a shear frequency of 10 rad/s. The physical properties of the silicone PSA produced from this composition are shown in Table 1.

Example 2

A silicone composition according to the present invention was prepared using the method of Example 1, except the amount of Silica A was increased to 77.6 parts. The viscosity of the composition is 11,724 Pa·s at a shear frequency of 10 rad/s. The physical properties of the silicone PSA produced from this composition are shown in Table 1.

Example 3

A silicone composition according to the present invention was prepared using the method of Example 1, except 27.2 parts of Silica B was substituted for the 27.2 parts of Silica A. The viscosity of the composition is 2,079 Pa·s at a shear frequency of 10 rad/s. The physical properties of the silicone PSA produced from this composition are shown in Table 1.

Example 4

A silicone composition according to the present invention was prepared using the method of Example 1, except 77.6 parts of Silica C was substituted for the 27.2 parts of Silica A. The viscosity of the composition is 6,259 Pa·s at a shear frequency of 10 rad/s. The physical properties of the silicone PSA produced from this composition are shown in Table 1.

Comparative Example 1

A silicone composition outside the scope of the present invention was prepared using the method of Example 1, except the 27.2 parts of Silica A was omitted. The viscosity of the composition is 1,205 Pa·s at a shear frequency of 10 rad/s. The physical properties of the silicone PSA produced from this composition are shown in Table 1.

TABLE 1

| Physical Property | Example 1 | Example 2 | Example 3 | Example 4 | Comparative Example 1 |
|---|---|---|---|---|---|
| Viscosity (Pa · s) 10 rad/s | 2,212 | 11,724 | 2,079 | 6,259 | 1,205 |
| Tack (g-force) | 347 | 345 | 673 | 343 | 313 |
| Peel Adhesion (N/m) | 525 | 460 | 493 | 350 | 602 |
| CTE ($\mu m/m°$ C.) 25 to 150° C. | 227 | 176 | 205 | 191 | 266 |

CTE = coefficient of thermal expansion

That which is claimed is:

1. A silicone composition for preparing a silicone pressure sensitive adhesive, the composition comprising:
   (A) 20 to 55 parts by weight of a polydiorganosiloxane containing an average of at least two silicon-bonded alkenyl groups per molecule;
   (B) 45 to 80 parts by weight of an organopolysiloxane resin comprising $R^3_3SiO_{1/2}$ units and $SiO_{4/2}$ units wherein each $R^3$ is independently selected from the group consisting of monovalent hydrocarbon and monovalent halogenated hydrocarbon groups, the mole ratio of $R^3{}_3SiO_{1/2}$ units to $SiO_{4/2}$ units is from 0.6:1 to 1.5:1, the resin contains less than about 2 mole percent of alkenyl groups, and the total amount of components (A) and (B) is 100 parts by weight;

(C) an organohydrogenpolysiloxane having an average of at least two silicon-bonded hydrogen atoms per molecule in an amount sufficient to cure the composition;

(D) 25 to 200 parts by weight of a silica filler having an average surface area less than 25 $m^2$/g; and (E) a catalytic amount of a hydrosilylation catalyst; wherein the sum of the average number of silicon-bonded alkenyl groups per molecule in component (A) and the average number of silicon-bonded hydrogen atoms per molecule in component (C) is greater than 4.

2. The composition according to claim 1, wherein the polydiorganosiloxane has a viscosity of from 0.05 to 100 Pa·s at 25° C.

3. The composition according to claim 1, wherein the polydiorganosiloxane has the formula $R^2R^1{}_2SiO(R^1{}_2SiO)_nSiR^1{}_2R^2$ wherein each $R^1$ is independently selected from the group consisting of monovalent hydrocarbon and monovalent halogenated hydrocarbon groups free of aliphatic unsaturation, $R^2$ is alkenyl, and n has a value such that the viscosity of the polydiorganosiloxane is from 0.05 to 10,000 Pa·s at 25° C.

4. The composition according to claim 3, wherein $R^1$ is methyl and $R^2$ is vinyl.

5. The composition according to claim 1, wherein the organopolysiloxane resin consists essentially of $(CH_3)_3SiO_{1/2}$ units and $SiO_{4/2}$.

6. The composition according to claim 1, wherein the mole ratio of $R^3{}_3SiO_{1/2}$ units to $SiO_{4/2}$ units in the organopolysiloxane resin is from 0.65:1 to 0.95:1.

7. The composition according to claim 1, wherein the organopolysiloxane resin contains less than 1 percent by weight of silicon-bonded hydroxyl groups.

8. The composition according to claim 1, wherein the organopolysiloxane resin is free of alkenyl groups.

9. The composition according to claim 1, wherein the organopolysiloxane resin is present in an amount from 55 to 70 parts by weight per 100 parts by weight of components (A) and (B) combined.

10. The composition according to claim 1, wherein the organohydrogenpolysiloxane is 1-octadecyl-1,3,5,7,9-pentamethylcyclopentasiloxane.

11. The composition according to claim 1, wherein the organohydrogenpolysiloxane is present in an amount sufficient to provide from 1.5 to 2 silicon-bonded hydrogen atoms per alkenyl group in components (A) and (B) combined.

12. The composition according to claim 1, wherein the silica filler has an average surface area of from 0.25 to 10 $m^2$/g.

13. The composition according to claim 1, wherein the silica filler is fused silica or ground quartz.

14. The composition according to claim 1, wherein the silica filler is prepared by treating the surface of a silica.

15. The composition according to claim 1, wherein the silica filler is present in an amount from 25 to 150 parts by weight per 100 parts by weight of components (A) and (B) combined.

16. The composition according to claim 1, wherein the hydrosilylation catalyst is a platinum catalyst.

17. The composition according to claim 1, further comprising a platinum catalyst inhibitor.

18. A silicone pressure sensitive adhesive, comprising a reaction product of the composition of claim 1.

19. A silicone pressure sensitive adhesive, comprising a reaction product of the composition of claim 2.

20. A silicone pressure sensitive adhesive, comprising a reaction product of the composition of claim 3.

21. A silicone pressure sensitive adhesive, comprising a reaction product of the composition of claim 5.

22. A silicone pressure sensitive adhesive, comprising a reaction product of the composition of claim 12.

23. A silicone pressure sensitive adhesive, comprising a reaction product of the composition of claim 15.

24. A multi-part silicone composition for preparing a silicone pressure sensitive adhesive, the composition comprising:

(A) 20 to 55 parts by weight of a polydiorganosiloxane containing an average of at least two silicon-bonded alkenyl groups per molecule;

(B) 45 to 80 parts by weight of an organopolysiloxane resin consisting essentially of $R^3{}_3SiO_{1/2}$ units and $SiO_{4/2}$ units wherein each $R^3$ is independently selected from the group consisting of monovalent hydrocarbon and monovalent halogenated hydrocarbon groups, the mole ratio of $R^3{}_3SiO_{1/2}$ units to $SiO_{4/2}$ units is from 0.6:1 to 1.5:1, the resin contains less than about 2 mole percent of alkenyl groups, and the total amount of components (A) and (B) is 100 parts by weight;

(C) an organohydrogenpolysiloxane having an average of at least two silicon-bonded hydrogen atoms per molecule in an amount sufficient to cure the composition;

(D) 25 to 200 parts by weight of a silica filler having an average surface area less than 25 $m^2$/g; and (E) a catalytic amount of a hydrosilylation catalyst; wherein the sum of the average number of silicon-bonded alkenyl groups per molecule in component (A) and the average number of silicon-bonded hydrogen atoms per molecule in component (C) is greater than 4; and neither component (A) nor component (B), when component (B) contains alkenyl groups, are present with component (C) and component (E) in the same part.

* * * * *